Figure 1:
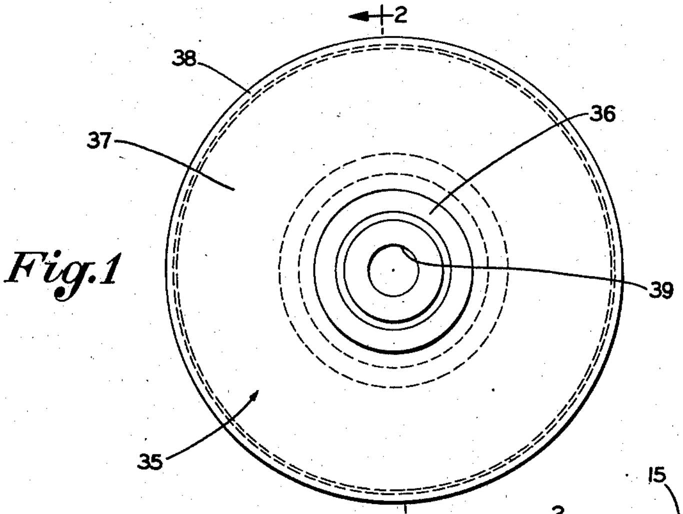

Aug. 6, 1957 N. V. SPROUL 2,801,724

CENTRIFUGAL CLUTCH CONSTRUCTION

Filed Nov. 12, 1954 2 Sheets-Sheet 1

INVENTOR.
Nolte V. Sproul

BY Frease & Bishop

ATTORNEYS

Aug. 6, 1957 N. V. SPROUL 2,801,724

CENTRIFUGAL CLUTCH CONSTRUCTION

Filed Nov. 12, 1954 2 Sheets-Sheet 2

INVENTOR.
Nolbe V. Sproul

BY Frease & Bishop

ATTORNEYS

United States Patent Office 2,801,724

Patented Aug. 6, 1957

2,801,724

CENTRIFUGAL CLUTCH CONSTRUCTION

Nolie V. Sproul, Massillon, Ohio, assignor to Automatic Steel Products, Inc., Canton, Ohio, a corporation of Ohio Application November 12, 1954, Serial No. 468,220

5 Claims. (Cl. 192—105)

My invention relates to improvements in centrifugal clutch construction and more specifically to weight type centrifugal clutches. Even more specifically, my invention relates to a centrifugal weight clutch construction in which the friction segments therein are universally pivotally connected to the driving member to allow for misalignment between the driving and driven members.

Some prior centrifugal weight clutch constructions include a driving member having arcuate friction segments consisting of weights and friction surfaces. These arcuate friction segments are frequently pivotally connected at one end to the driving member so that they may swing or move radially outward away from the driving member in response to centrifugal force, and thereby engage a driven member to complete the clutch coupling. Frequently another portion of the friction segment is connected to the driven member by spring means to retain the friction segment out of contact with the driven member until a predetermined rotational driving member speed is reached. This pivotal connection between the driving member and the friction segments usually has only permitted radial swinging movement of the friction segments in relation to the driven member.

One of the principal disadvantages of this type of prior centrifugal weight clutch construction results when this clutch construction is used in coupling type clutches, that is, clutches in which the driving member is mounted on a driving shaft and the driven member is mounted on a separate axially aligned driven shaft. In this type of application, using this prior clutch construction, it has been necessary to maintain the driving and driven shafts in absolute alignment so that the driving and driven members of the clutch are in absolute alignment.

If any misalignment is present in such prior clutch construction, uneven shoe wear occurs and erratic engagement and disengagement of the clutch members result creating high stresses and uneven wear on the various parts of the clutch. This has in turn resulted in unsatisfactory performance of the clutch as well as premature failure of members in the clutch.

Another type of prior clutch construction includes radially projecting rubber segments which are bonded at one end to the driven member and at the other end to friction elements, and the friction elements include weight portions and friction surface portions. In this case, as the driven member is rotated, centrifugal force is exerted on the friction elements causing the bonded rubber segments to stretch and allow the friction surface portions to engage a driven member. The engagement speed is determined by the design and resiliency of the bonded rubber segments.

One of the difficulties with this type of prior centrifugal clutch construction is that it is difficult to construct such a clutch for an accurate predetermined release speed. Additionally, once the release speed has been obtained, it is impossible to change the release speed without completely reconstructing the driving member.

Further, difficulty has been encountered from the heat caused through the necessary slippage between the friction surface portions and the driven member in the early stages of clutch engagement. This heat, thus created, causes the rubber segments to take a set and lose much of their resiliency thereby changing the release speed of the clutch.

Another difficulty in this prior construction is that any wear on the friction segments will cause the release speed of the clutch to change a great amount, since any friction segment wear requires the rubber segments to stretch further, and since the amount of deformation per amount of load is much lower for these rubber segments than for most metal springs. Finally, high stresses are created in the rubber segments at the bond between the same and the driving member and the friction segments, and all of these factors have contributed to give unsatisfactory and erratic performance.

Although this prior type of clutch construction, using rubber segments between the driving member and the friction segments, has reduced misalignment difficulties between the driving and driven member, because of its many difficulties and disadvantages, it has proven unsatisfactory. There, therefore, exists in the the clutch field, a need for a coupling type clutch which will perform satisfactorily under misalignment conditions.

It is therefore a general object of the present invention to provide a centrifugal clutch construction which eliminates the indicated disadvantages of prior constructions.

It is a primary object of the present invention to provide a centrifugal clutch construction which provides flexibility and performs satisfactorily under misalignment conditions in a coupling type clutch.

It is another object of the present invention to provide a centrifugal clutch construction in which the temperature resulting from slippage of the friction segments on the driven member will not affect the release speed or performance of the clutch.

It is a further object of the present invention to provide a centrifugal clutch construction which allows convenient friction shoe replacement and ease in changing the release speed.

Finally, it is an object of the present invention to provide a centrifugal clutch construction which accomplishes all of the above objects but yet is simple in construction and economical to produce.

These and other objects are accomplished by the parts, constructions, arrangements, combinations and sub-combinations comprising the present invention, the nature of which is set forth in the following general statement, a preferred embodiment of which—illustrative of the best mode of which applicant has contemplated applying the principles—is set forth in the following description and illustrated in the accompanying drawings, and which is particularly and distinctly pointed out and set forth in the appended claims forming a part hereof.

In general terms, the improved centrifugal clutch construction constituting the present invention may be stated as including a driving member, a driven member, and friction weight means universally pivotally connected to the driving member for frictional engagement with the driven member in response to centrifugal force.

More specifically, the improved centrifugal clutch construction constituting the present invention may be stated as including a hub member, side plates mounted on the hub member in spaced apart relationship, socket member means mounted between the side plates, weight segments having outer preferably arcuate surfaces and ball portions at one end thereof, the ball portions of the weight segments being engaged in the socket member means for universal pivotal movement therein, friction shoes engaged over the outer surfaces of the weight segments, resilient means connecting the end of the weight segments opposite the ball portion end to the side plates, and a housing member having an inner annular surface; whereby centrifugal force on the weight segments as the hub member rotates causes the weight segments to move or swing radially outward forcing the friction shoes against the inner annular surface of the housing member, and thereby the ball socket joint allows the weight segments to tilt axially to accommodate any misalignment between the friction shoes and the inner annular surface of the housing member.

Figure 9:
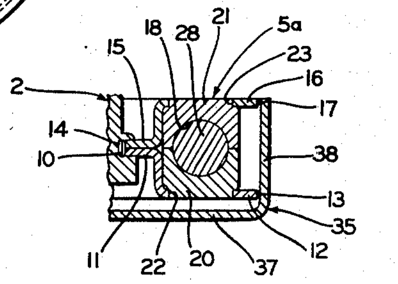
Figure 2:
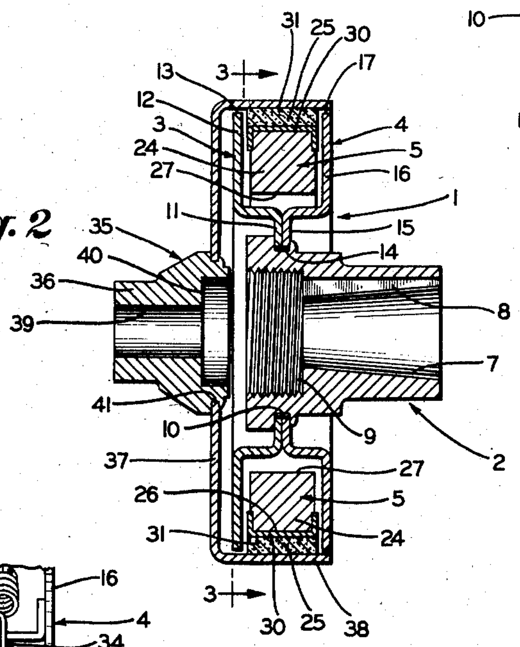
Figure 8:
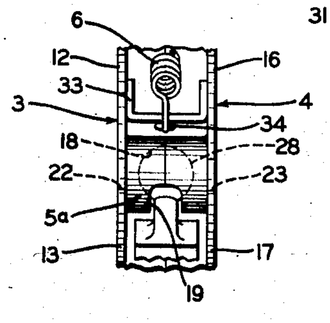
Figure 3:
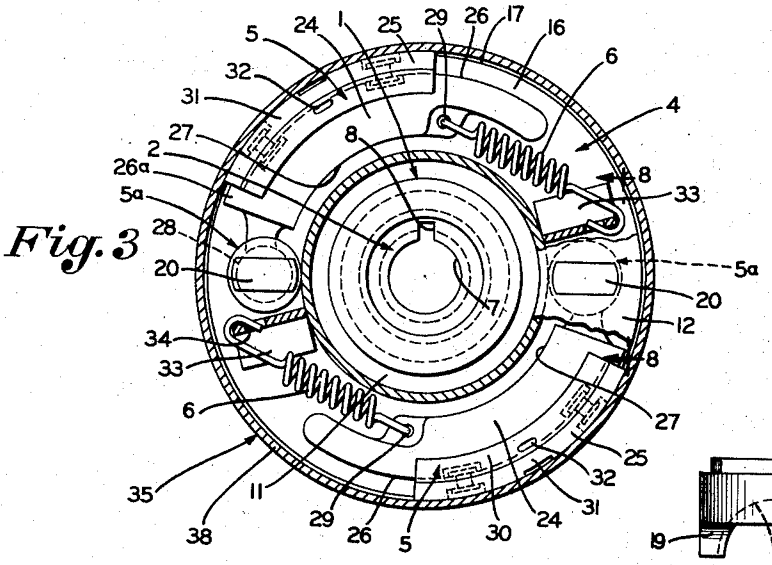
Figure 6:
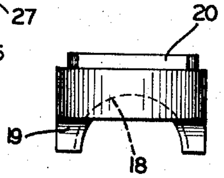
Figure 4:
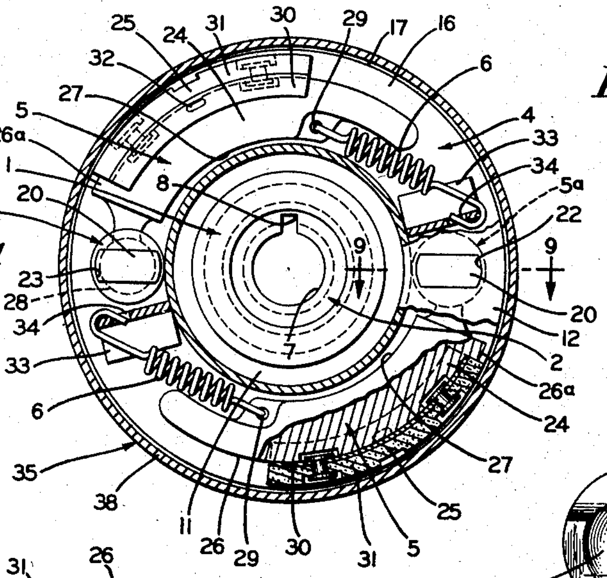
Figure 7:
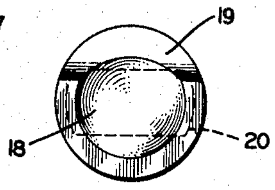
Figure 5:
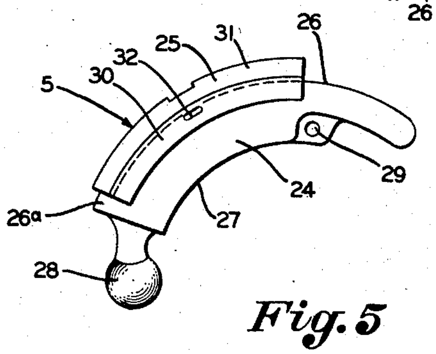

By way of example, an embodiment of the centrifugal clutch construction of the present invention is illustrated in the accompanying drawings forming a part hereof, wherein like numerals indicate similar parts throughout the several views, and in which:

Fig. 1 is an end elevation looking at the housing member;

Fig. 2, a sectional view of the clutch engaged, looking in the direction of the arrows 2—2, in Fig. 1;

Fig. 3, a sectional view of the clutch engaged, looking in the direction of the arrows 3—3, in Fig. 2;

Fig. 4, a view similar to Fig. 3, with the clutch disengaged;

Fig. 5, a side elevation of a weight member and friction shoe disassembled from the clutch;

Fig. 6, an enlarged top elevation of one-half of a socket member of one of the ball socket joints;

Fig. 7, an enlarged side elevation of one-half of a socket member of one of the ball socket joints viewing the inside portion of the socket;

Fig. 8, an enlarged fragmentary view looking in the direction of the arrows 8—8 in Fig. 3; and Fig. 9, an enlarged fragmentary sectional view looking in the direction of the arrows 9—9, in Fig. 4.

The improvements in centrifugal clutches of the present invention are shown in the accompanying drawings included in a coupling type clutch, that is, a clutch in which the driving member is mounted on a driving shaft and the driven member is mounted on a separate driven shaft which is axially aligned with and slightly axially spaced from the driving shaft. Although shown in a coupling type clutch, the improvements of the present invention may be included in a pulley type clutch, that is, a clutch in which the driven member is journaled on the driving member hub with a bearing therebetween and with the driven device connected to the driven member of the clutch by means of a V-belt, chain or like drive. The improvements of the present invention, however, are most beneficial in a coupling type clutch, as shown, since in this type of application, misalignment conditions between the driving and driven members are most likely to occur.

The driving or rotor member generally indicated at 1 includes a hub generally indicated at 2, side plates generally indicated at 3 and 4, friction segments generally indicated at 5, socket members generally indicated at **5*a* and resilient or spring members generally indicated at 6**.

The hub member 2 is cylindrical in configuration and has a central tapered portion 7 running axially of the hub. The key-way 8 also runs axially of the hub and is formed in the outer periphery of the tapered bore 7. The tapered bore 7 and the keyway 8 extend through the hub 2 toward the inner end where the cylindrical threaded bore 9 is formed, as best seen in Fig. 2. The purpose of the tapered bore 7, the key-way 8, and the threaded bore 9 will be hereinafter described.

The side plate generally indicated at 3 is generally disclike in configuration and has a centrally located opening 10 formed therein, as shown in Fig. 2. The side plate 3 extends radially outward from the central opening 10, then axially and then radially outward to an outer annular edge. Thus, a recessed portion 11, a side portion 12, and an annular edge portion 13 are formed. Rotor side plate 4 is formed similarly to rotor side plate 3, and has a centrally located opening 14, a recessed portion 15, a side portion 16, and an outer annular edge 17.

The hub member 2 is received in central opening 10 and 14 in the side plates 3 and 4 with the recessed portion 11 of the side plate 3 closely abutting the recessed portion 15 of the side plate 4 and with the side portions 12 and 16 in spaced apart relationship, as shown in Fig. 2. These side plates 3 and 4 are mounted on the hub 2 preferably by staking. The hub 2 is preferably a steel screw machine part and the side plates 3 and 4 are preferably steel stampings.

The socket members **5*a* are generally cylindrical in shape with spherical openings 18 formed centrally therein, as best seen in Fig. 8. A recess or slot 19 is formed in the outer annular surfaces of the socket member 5*a* which recess extends across and opens into the spherical opening 18. Mounting projections 20 and 21 are formed at either end of the socket members 5*a*** and extend from these end surfaces.

Openings 22 and 23 are formed in the side portions 12 and 16 respectively of the side plates 3 and 4 and the mounting projections 20 and 21 of the socket members **5*a* are received in these openings 22 and 23, thus solidly securing the socket members 5*a* against movement between the side plates 3 and 4 as shown clearly in Figs. 8 and 9. The socket members 5*a*** are formed of any suitable material such as bronze or steel and are preferably formed in two parts as shown in Fig. 8, for ease in manufacture and assembly.

The friction sigments 5 preferable include weight members 24 and friction shoe members 25. The weight members 24 are preferably rectangular in cross-section, made from any suitable metal such as iron or steel, and have arcuate outer surfaces 26 and arcuate inner surfaces 27. A raised or projecting portion **26*a* is formed on the outer arcuate surface 26. A spherical or ball portion 28 is formed at one end of the weight members 24 and an opening 29** is formed at the other end.

The friction shoe member 25 is preferably formed of a metal shoe holder 30 and friction material 31. The metal shoe holder 30 is preferably a steel stamping, U-shaped in cross-section and has the friction material 31 fastened to it by any usual manner, for instance, by riveting as shown in Figs. 3 and 4. The friction material 31 is preferably of asbestos base with a phenol binder but could be any friction material organic or metallic.

The U-shaped metal shoe holder 30 is received over the outer arcuate surface 26 of the weight member 24 with recesses or dimples 32 tightly engaged on the sides of the weight members 24 to hold friction shoe members 25 in place. One of the ends of the friction shoe members 25 abut the raised portions **26*a* for a purpose to be hereinafter described. By this means, the friction shoe members 25 may be easily removed from the weight members 24** for replacement, if desired.

The friction segments 5 are mounted in the driving member 1 with the ball portions 28 received through the slots or recess 19 and in the spherical openings 18 in the socket members **5*a*. In this manner, the friction segments 5 are mounted between the side plates 3 and 4 so that torque may be transmitted from the side plates 3 and 4 to the friction segments 5 and at the same time the friction segments 5 are universally pivotally movable in the socket members 5*a***. In other words, the socket members retain the friction segments against movement in reference to the side plates other than this universal pivotal movement.

U-shaped spring connectors 33 are also mounted between the side plates 3 and 4 adjacent the socket members **5*a*, as best seen in Figs. 3, 4 and 8. These spring connectors 33 are preferably spot welded or otherwise fastened to the side plates 3 and 4 and have openings 34 formed in the portion extending between the two side plates 3 and 4. Helical springs 6 are mounted between the ends of the friction segments 5** and the spring connectors 33 with the ends of the springs 6 being received through the openings 29 in the friction segments 5 and the openings 34 formed in the spring connectors 33.

The driven or housing member generally indicated at 35 includes a hub 36, a housing side plate portion 37 and an axially extending annular flange portion 38. The hub 36 is generally cylindrical in shape and has an annular bore 39 formed centrally therein and axially of the hub member 36. The bore 39 extends toward the inner side of the hub 36 where it is enlarged at 40 for a purpose to be hereinafter described.

The housing side plate portion 37 is formed with a centrally located annular opening 41 and the side plate extends radially outward to a diameter slightly larger than the diameter of the side plates 3 and 4 of the driving member 2. Connected to the outer annular periphery of the housing side plate portion 7 is an axially extending annular flange portion 38, as seen in Fig. 2. The flange portion 38 extends axially over the side plate 3, friction segments 5 and the side plate 4 of the driving member 2. The hub 36 is preferably a steel screw machine part and the side plate portion 37 and the flange portion 38 are preferably integrally formed as a sheet metal stamping such as steel.

The inner end of the hub 36 is received through the opening 41 of the housing side plate portion 37 and the hub 36 and the side plate portion 37 are connected preferably by staking, as shown in Fig. 2.

In operation, a driving shaft, not shown, is received in the tapered bore 7 of the hub 2 with a key being placed in the key-way 8 of the hub 2 and received in a similar key-way in the driving shaft. The purpose of the threaded bore 9 in the hub 2 is for easy removal of the hub 2 from the driving shaft 7, that is, a puller device may be threaded in the threaded bore 9 and the driving member 1 removed from the driving shaft.

As the driving shaft is rotated, rotational motion is transmitted from the driving shaft to the hub 2, from the hub 2 to the side plates 3 and 4, from the side plates 3 and 4 to the socket members 5*a* and from the socket members 5*a* to the friction segments 5. The raised or projecting portions 26*a* on the weight members 24 and the dimples 32 formed on the sides of the shoe holders 30 provide driving engagement between the weight members 24 and the friction shoe members 25. The spring 6 retains the friction segments inwardly, with the inner arcuate surfaces 27 of the friction segments 5 abutting the recessed portions 11 and 15 of the side plates 3 and 4, in a position similar to that shown in Fig. 4.

When the rotational speed of the driving member is sufficient that the centrifugal force of the friction segments 5 overcomes the tension of springs 6, the friction segments 5, through the ball portion 28 mounting in the socket members 5*a*, swing radially outward. These friction segments 5 move outward until the friction shoe members 25 engage the inner surface of the axially extending annular flange portion 38 on the driven member 35, as shown in Fig. 3.

There will be some slipping between the friction material 31 on the friction shoe member 25 and the flange portion 38 of the driven member 35 until the driven member reaches the same rotational speed as the driving member 1. At that time, there is no relative rotational movement between the driving member 1 and the driven member 35, and the clutch engagement is complete.

The driven member 35 may be connected to a shaft of a device to be driven through the bore 39 in the hub 36. The larger bore 30 in the hub 36 receives a threaded end of the driven shaft, not shown, and a nut threaded thereon is received in the recess 40 to connect the hub 36 to the driven shaft.

Since the friction segments 5 are connected to the driving member 1 through the ball portions 28 journaled in the spherical recesses in socket members 5*a*, universal pivotal movement is provided between the driven member 1 and the friction segments 5. Thus, if there is any misalignment between the driving and driven shafts and consequently between the driving member 1 and the driven member 35, the friction segments 5 may tilt or move in any direction so that the surface of the friction material 31 on the friction shoe member 25 may conform with the inner surface of the axially extending annular flange portion 38 of the driven member 35. In this way, despite misalignment between the driving and driven shafts, the clutch operates satisfactorily and provides driving engagement between the driving and driven shafts without causing excessive stresses in the various parts of the clutch.

In this construction, the springs 6 may be easily replaced if it is desired to change the release or engagement speed of the clutch by merely removing them from the openings 29 and 34. Also, as before stated, the friction shoe members 25 may be easily removed from the weight members 24 in the event the friction material 25 wears to such an extent that it requires replacement.

Although the hub member 2 of the driving member 1 and the hub member 36 of the driven member 35 have been shown with particular bores and means of fastening them to driving and driven shafts, these hub members 2 and 36 may be attached to the driving and driven shafts by any usual means. Also, the staking operations used to mount the side plates 3 and 4 on the hub 2 and the housing side plate portion 37 on the hub member 36 may be replaced by any usual connection means such as by welding or brazing.

Thus the centrifugal clutch construction of the present invention provides an amount of flexibility and performs satisfactorily under misalignment conditions on coupling type clutch applications; provides a device in which the temperature caused by slippage between the friction segments and the driven member does not affect the release speed or performance of the clutch; and provides a device which allows convenient friction shoe replacement and ease in changing the release speed and which is simple in construction and economical to manufacture.

In the foregoing description, certain terms have been used for brevity, clearness and understanding, but no unnecessary limitations are to be implied therefrom, because such words are used for descriptive purposes herein and are intended to be broadly construed.

Moreover, the embodiment of the improved construction, illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful constructions and reasonable mechanical equivalents thereof obvious to those skilled in the art are set forth in the appended claims.

I claim:

1. Centrifugal clutch construction including a driving member, socket members solidly mounted on the driving member, friction segments each having a ball portion at one end thereof, the ball portions being journaled in the socket members for universal pivotal movement, said socket members retaining said ball portions against movement in reference to the driving member in all directions other than said universal pivotal movement, resilient means connected directly to the friction segments and directly to the driving member, and a driven member engageable by said friction segments in response to centrifugal force upon rotation of the driving member.

2. The clutch construction defined in claim 1 in which the friction segments include weight members and friction shoe members, and in which the friction shoe members are removably mounted on the weight members.

3. Centrifugal clutch construction including an axially extending driving hub member, radially outwardly projecting side plates mounted on the driving hub member in spaced apart relation, two-piece socket members mounted between the side plates, the side plates retaining said socket members in assembled position, friction segments having ball portions, the friction segment ball portions being journaled in the socket members for universal pivotal movement, the socket members retaining the friction segment ball portions against movement in reference to the side plates in all directions other than said universal pivotal movement, resilient means connected to the friction segments and to at least one side plate, and a driven member engageable by said friction segments in response to centrifugal force upon rotation of the driving hub member.

4. The clutch construction defined in claim 3 in which each of the socket member pieces is provided with a generally axially extending projection, in which the side plates are provided with sets of axially aligned apertures formed therein, and in which the socket members are mounted between the side plates with the projections received in the side plate apertures.

5. The clutch construction defined in claim 3 in which the resilient means includes helical springs, in which spring connecting members are connected to the side plates and extend therebetween, in which the helical springs are connected to the spring connecting members, in which the friction segments include weight members and friction shoe members, and in which the friction shoe members are removably mounted on the weight members.

References Cited in the file of this patent

UNITED STATES PATENTS

| | | |
|---|---|---|
| 975,583 | Symmonds | Nov. 15, 1910 |
| 2,275,046 | Harris | Mar. 3, 1942 |
| 2,713,928 | Pohl | July 26, 1955 |